(12) United States Patent
Beghini et al.

(10) Patent No.: US 8,503,934 B2
(45) Date of Patent: Aug. 6, 2013

(54) MULTI-MODE COMMUNICATIONS SYSTEM

(75) Inventors: Kenneth P. Beghini, Hilton, NY (US);
Eric Van Ness, Macedon, NY (US);
Donald R. Martz, Webster, NY (US);
David Hinterberger, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 524 days.

(21) Appl. No.: 12/841,530

(22) Filed: Jul. 22, 2010

(65) Prior Publication Data

US 2012/0021700 A1    Jan. 26, 2012

(51) Int. Cl.
*H04B 7/00* (2006.01)
(52) U.S. Cl.
USPC ... 455/41.2; 455/90.2; 455/552.1; 455/456.1; 455/509; 455/518; 395/395.52
(58) Field of Classification Search
USPC .............. 455/41.2, 552.1, 456.1, 518, 509; 45/90.2; 370/395.52
See application file for complete search history.

(56) References Cited

U.S. PATENT DOCUMENTS

| | | | |
|---|---|---|---|
| 4,700,375 A | 10/1987 | Reed | |
| 5,870,149 A | 2/1999 | Comroe et al. | |
| 5,913,163 A | 6/1999 | Johansson | |
| 6,141,540 A | 10/2000 | Richards et al. | |
| 6,215,474 B1 | 4/2001 | Shah | |
| 6,374,091 B1 | 4/2002 | Richards et al. | |
| 6,415,158 B1 | 7/2002 | King et al. | |
| 6,449,499 B1 | 9/2002 | Ishikura et al. | |
| 6,542,758 B1 | 4/2003 | Chennakeshu et al. | |
| 6,850,738 B2 | 2/2005 | Nokkonen et al. | |
| 6,882,870 B2 | 4/2005 | Kivelaet et al. | |
| 7,016,673 B2* | 3/2006 | Reddy et al. ............... | 455/426.2 |
| 7,076,675 B2 | 7/2006 | Martinez Perez et al. | |
| 7,099,680 B2* | 8/2006 | Roderique .................... | 455/509 |
| 7,239,874 B2* | 7/2007 | Reddy et al. .................. | 455/436 |

(Continued)

FOREIGN PATENT DOCUMENTS

JP        2001320298 A    11/2001
WO   WO-2004032536 A2    4/2004

(Continued)

OTHER PUBLICATIONS

Martz, D., et al., U.S. Appl. No. 12/614,801, filed Nov. 9, 2009, entitled "Remote Control of Mobile Radio System Through Portable Radio System".

(Continued)

*Primary Examiner* — Marceau Milord
(74) *Attorney, Agent, or Firm* — Fox Rothschild, LLP; Robert J. Sacco

(57) ABSTRACT

A communications device includes a first radio (106, 300) configured to support wireless communications with a second radio (104) using a plurality of communications modes. The device includes a switch element (118, 326) configured to cause the first radio to transmit when actuated. The device also includes a control element (306, 324) for detecting one or more actuations of the switch element and configured to select a one of the plurality of communications modes based on a sequence of the actuations of the switch element detected by the control element during a pre-defined time interval and to cause a wireless transmission from the first radio to the second radio according to the one of the plurality of communications modes.

22 Claims, 3 Drawing Sheets

U.S. PATENT DOCUMENTS

| | | | |
|---|---|---|---|
| 7,280,807 B2 | 10/2007 | Nguy et al. | |
| 7,522,918 B2 * | 4/2009 | Wachter et al. | 455/423 |
| 7,640,246 B2 * | 12/2009 | Nam Koong et al. | 1/1 |
| 7,761,087 B2 * | 7/2010 | Kharia et al. | 455/414.1 |
| 8,060,085 B2 * | 11/2011 | Goulder et al. | 455/432.2 |
| 8,145,262 B2 * | 3/2012 | Martinez et al. | 455/552.1 |
| 8,180,118 B2 * | 5/2012 | Neil et al. | 382/124 |
| 8,279,868 B2 * | 10/2012 | Martinez et al. | 370/392 |
| 2004/0127214 A1 | 7/2004 | Reddy et al. | |
| 2006/0046756 A1 | 3/2006 | Kies | |
| 2007/0065357 A1 | 3/2007 | Chien | |
| 2007/0142072 A1 | 6/2007 | Lassally | |
| 2007/0225049 A1 | 9/2007 | Andrada | |
| 2008/0057893 A1 | 3/2008 | Patla | |
| 2008/0200208 A1 | 8/2008 | Llanos et al. | |
| 2008/0318639 A1 | 12/2008 | Crestol | |
| 2009/0088151 A1 | 4/2009 | Karabinis | |
| 2009/0291646 A1 | 11/2009 | Ong et al. | |
| 2011/0111791 A1 | 5/2011 | Martz et al. | |
| 2011/0195739 A1 * | 8/2011 | Deleus et al. | 455/518 |
| 2011/0201379 A1 * | 8/2011 | Jastram et al. | 455/550.1 |
| 2011/0281533 A1 * | 11/2011 | Deleus et al. | 455/90.2 |

FOREIGN PATENT DOCUMENTS

| | | |
|---|---|---|
| WO | WO-2004057891 A1 | 7/2004 |
| WO | 2006125043 A1 | 11/2006 |
| WO | 2010006650 A1 | 1/2010 |
| WO | 2011056746 A1 | 5/2011 |

OTHER PUBLICATIONS

Information about Related Patents and Patent Applications, see section 6 of the accompaying Information Disclosure Statement Letter, which concerns Related Patents and Patent Applications. Mar. 6, 2012.

Wei, Hung-Yu, et al., "Two-Hop-Relay Architecture for Next Generation WWAN/WLAN Integration", IEEE Wireless Communications, IEEE Service Center, Piscataway, NJ, US, vol. 11, No. 2, Apr. 1, 2004, pp. 24-30.

"NOKIA 6110 User's Guide, 9351506, Issue 2", Electronic User's Guide Released Subjet to Nokia's User's Guides Terms and Conditions, xx, xx, Jun. 7, 1998, pp. 1-65.

Harris Corporation, International Search Report mailed Nov. 7, 2011, Application Serail No. PCT/US2011/041798.

Anonymous: RF-7800R-RC Universal Remote Control System [online], Harris Corporation Jun. 30, 2009, p. 2PP, XP002618884 [retrieved on Jan. 26, 2011]. Retrieved from the Internet: <URL: http://www.rfcom.harris.com/media/RF-7800R-RC%20Universal%20Remote%20Control%20 System_tcm26-12078.pdf>.

Harris Corporation, International Search Report mailed Feb. 25, 2011; International Application No. PCT/US2010/054946.

\* cited by examiner

200

MULTI-MODE COMMUNICATIONS SYSTEM

FIELD OF THE INVENTION

The present invention relates to communications systems and methods for operating the same, and more specifically to multi-mode communications systems.

BACKGROUND

In general, Land Mobile Radio (LMR) users, such as law enforcement officials and other public safety officers, will have access to different LMR units in the field. For example, law enforcement officials, such as uniformed police officers, will generally be issued a handheld or portable LMR unit to carry on their person at all times. In general, such portable LMR units are designed with a reduced size and weight to enhance portability. Accordingly, portable LMR units typically have a limited transmission power and a low receive sensitivity. In some cases, public safety officers are issued a vehicle including a mobile LMR unit. Such mobile units are not typically constrained by the size and weight limitations of portable LMR units. Accordingly, such mobile LMR units typically have a transmission power and a receive sensitivity that is greater than that of portable LMR units. As a result, mobile LMR units generally can operate over a greater range or distance. Nonetheless, such mobile units are often underutilized, as many public safety officers generally rely on their portable LMR unit for most, if not all, wireless communications. As a result, wireless communications between public safety officers may be disrupted or otherwise fail due to the limited capabilities of portable LMR units.

SUMMARY

Embodiments of the present invention describe multi-mode communications systems and methods for operating the same. In a first embodiment, a communications device is provided. The device includes a first radio configured to support wireless communications with a second radio using a plurality of communications modes and a switch element communicatively coupled to the first radio to cause the first radio to transmit when the switch element is actuated. The device also includes a control element for detecting one or more actuations of the switch element and configured to select one of the plurality of communications modes based on a sequence of the actuations of the switch element detected by the control element during a pre-defined time interval and to cause a wireless transmission from the first radio to the second radio according to the one of the plurality of communications modes.

In a second embodiment, a method is provided for operating a communications device which includes a first radio configured to support wireless communications with a second radio using a plurality of communications modes and a switch element communicatively coupled to the first radio to cause the first radio to transmit when the switch element is actuated. The method includes the steps of detecting one or more actuations of the switch element during a pre-defined time interval and selecting a one of the plurality of communications modes based on a sequence of the actuations of the switch element during the pre-defined time interval. The method also includes the step of causing a wireless transmission from the first radio to the second radio according to the one of the plurality of communications modes.

In a third embodiment, a wireless communications system is provided. The system includes a first radio device and a second radio device. In the system, the first radio device is configured to support long-range wireless communications with a distant radio device and short-range wireless communications with the second radio device. Further, the second radio device is configured to support the long-range wireless communications with the distant radio and the short-range wireless communications with the first radio device. Additionally, a transmit power of the second radio device during the long-range communications is greater than a transmit power of the first radio device during the long-range communications. In the system, the first radio device includes a switch element communicatively coupled to the first radio and a control element. The switch element is configured to cause the first radio to transmit when the switch element is actuated and the control element is configured for detecting one or more actuations of the switch element, for selecting a one of the plurality of communications modes based on a sequence of the actuations of the switch element detected by the control element during a pre-defined time interval, for causing a wireless transmission from the first radio to the second radio according to said one of said plurality of communications modes.

DETAILED DESCRIPTION

Figure 1:
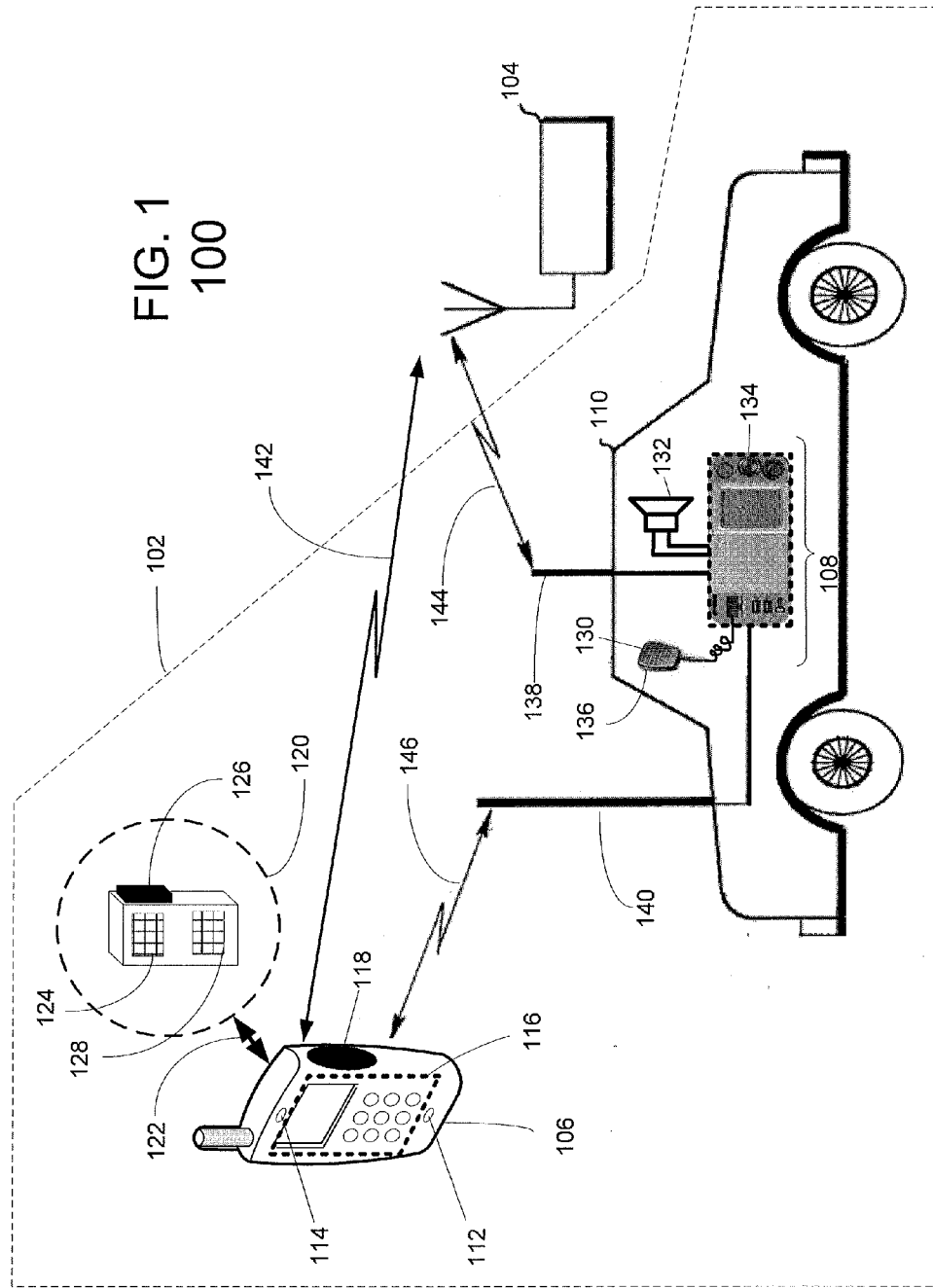
FIG. 1 is a schematic illustration of a communications system configuration according to an embodiment of the invention.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

As described above, many types of public safety officers generally have access to two types of LMR radios: (1) a portable LMR unit on their person; and (2) a mobile unit, typically located in a vehicle or some other nearby location. In general, these LMR units are configured to operate using different input and output components. For example, a portable LMR unit will generally include a speaker and microphone integrated into the unit. In some cases, a headset or remote handset, connected via a wireless or wireline connection may be used with the portable LMR unit. Similarly, a different headset or remote handset, connected via a wireless or wireline connection may be used with the mobile LMR unit. However, selecting between several equivalent devices can sometimes be confusing, especially if the user is unaware of the different capabilities of each device. As a result, a user typically uses the LMR unit that they are most accustomed to rather than the LMR unit that is most appropriate for the communications range. For example, police officers are typically observed using their portable LMR units and attempting long-range communications, despite the fact that they are sitting in or are positioned next to a vehicle that includes a mobile LMR unit that easily supports the long-range communications being attempted.

In view of the difficulties facing such LMR unit users and other users having access to similar communications system configurations, embodiments of the invention provide systems and methods that allow more efficient use of such communications system configurations via a simplified and common user interface. In particular, the various embodiments of the invention provide a new communications system configuration in which a first radio and at least a second radio are provided, where a communications range of the second radio is greater than that of the first radio. In this new configuration, communications with a distant radio are initiated by the first radio and are selectively routed through the second radio. In the various embodiments of the invention, the selective routing is accomplished by actuating the switch element in different sequences to select different communications modes for the communications system. For example, different numbers of actuations of a push-to-talk (PTT) button of a portable LMR unit can result in which a first communications mode in which communications with a base unit is established directly or a second mode in which communications with a base unit is established indirectly via a nearby mobile LMR unit. In the second mode scenario, the portable LMR unit can control the operations of the mobile LMR unit and/or change one or more operating parameters of the mobile LMR unit. For instance, a channel of the mobile unit can be changed in response to a signal received from the portable LMR radio. The operation of such a system is described below with respect to FIG. 1.

FIG. 1 is a schematic illustration of a communications system configuration 100, according to an embodiment of the invention. As shown in FIG. 1, the system 100 includes a local radio system 102 that communicates with at least one distant radio 104. The distant radio 104 can be any type of radio system, including, but not limited to, other fixed and mobile terminals operating in a same wireless communication network as the local radio system. For example, the distant radio can be a base station in a wireless communications network in which local radio system 102 operates or other portable or mobile radio systems operating within a communications range of local radio system 102.

As shown in FIG. 1, local radio system 102 includes a portable radio 106 and a mobile radio 108, each capable of supporting long-range wireless communications with a distant radio 104. The term "portable", as used herein with respect to a device, refers to a device designed to be carried by a person during its use. Thus, portable radio 106 can be any handheld radio device held in the user's hand during use or otherwise attached to the user. For example, portable radio 106 can be attached to a user's belt and/or other clothing or have a strap or other attachment feature to retain the portable radio 106 to the user's body during its use. In contrast, the term "mobile", as used herein with respect to a device, refers to device that can be transported from location to location, but that is not generally attached to the user during its use. For example, as shown in FIG. 1, mobile radio 108 is disposed in a vehicle 110. The term "long-range communications" refers to communications occurring with high transmit power (typically greater than 100 mW) and ranges in excess of several hundred meters. The design and configuration of portable and mobile radios supporting long-range communications are well known to those of ordinary skill in the art and will not be described herein.

As shown in FIG. 1, portable radio 106 includes a microphone 112 and a speaker 114 for input and output of audio information. Portable radio 106 also includes a user interface 116. The user interface 116 can include any input and output devices for configuring the operation of portable radio 106. For example, the user interface 116 can include control devices, such as keys, switches, and knobs, and display devices, such as a screen of lighted indicators. These control and display devices can be used by the user to select radio operation parameters, such as a frequency of operation, a modulation method, and a speaker volume, to name a few. In some embodiments, the user interface 116 can also be used to exchange alphanumeric and/or graphical information with distant radio 104.

Additionally, portable radio 106 includes a switch element 118. In the various embodiments of the invention, this switch element 118 can be actuated to operate the portable radio 106. That is, in response to an actuation of switch element 118, the portable radio begins to exchange information with distant radio 104. For example, in some embodiments of the invention, the switch element 118 can operate as a push-to-transmit (PTT) switch. That is, as long as switch element 118 is actuated, the portable radio 106 operates in a transmit mode. When switch element 118 is released, the portable radio 106 operates in a receive mode. In other embodiments of the invention, the switch element 118 can be used to start and end communication sessions. That is, actuation of the switch element 118 configures the portable radio to begin operating in a transmit mode, a receive mode, or both. In some cases, the communication session is maintained only as along as switch element 118 remains actuated. In other cases, a first actuation of switch element 118 is used to initiate the communications session and a second actuation of switch element 118 is used to terminate the communications session. However, the invention is not limited in this regard. In the various embodiments of the invention, any type of actuation configuration can be used for initiating and/or terminating a communications session.

In some embodiments of the invention, portable radio 106 can be communicatively coupled to a remote unit 120 via a local or short-range communications link 122, as shown in FIG. 1. For example, remote unit 120 can be an auxiliary handset or a headset. However, the various embodiments of the invention are not limited in this regard and remote unit 120 can have other configurations. In the various embodiments of the invention, the short range communications link 122 can be established using a wireless or wireline connection. For example, a cable connecting portable radio 106 and remote unit 120 can be provided for forming the short-range communications link 122. In another example, the short-range communications link 122 between the remote unit 120 and the portable radio 106 can be provided by using short-range wireless communications. Thus, the remote unit 120 and the portable radio 106 also include components for supporting short-range wireless communications. As used herein, the term "short-range communications" refers to communications occurring with low transmit power (typically less than 100 mW) and ranges up to several hundred meters. For example, short-range wireless communications can be provided by a communications link using short-range wireless communications protocols. For example, such protocols include, but are not limited to, Zigbee, Z-Word, Bluetooth, Wi-Fi, DECT, and CAT-IQ protocols. However, the invention is not limited in this regard and any other protocols for short-range communications can be used in the various embodiments of the invention.

As shown in FIG. 1, the remote unit 120 can also replicate some or all of the features of the portable unit. In the exemplary configuration shown in FIG. 1, the remote unit 120 includes a remote microphone 124 and a remote switch element 126. The remote unit 120 can also include a remote speaker 128. In the various embodiments of the invention, the remote microphone 124, the remote switch element 126, and the remote speaker 128 are configured to mirror the operation of microphone 112, switch element 118, and speaker 114. Accordingly, the description above for components 112, 114, and 118 is sufficient for purposes of describing components 124, 126, and 128.

As described above, the local radio system 102 also includes mobile radio 108 disposed in vehicle 110. However, the invention is not limited in this regard and mobile radio can be located in other fixed and mobile structures, such as buildings, aircraft, spacecraft, and the like. The mobile radio 108 can be configured similarly to portable radio 106. That is, mobile radio can also include a microphone 130, a speaker 132, a user interface 134, and a switch element 136. Accordingly, the description of components 112-118 above is sufficient for purposes of describing elements 130-136 in FIG. 1. Mobile radio 108 can also be configured to support short-range communications, as described above with respect to portable radio 106 and remote unit 120. In the embodiments illustrated in FIG. 1, mobile radio 108 supports long-range communications via a first antenna element 138 and short-range communications via a second antenna element 140. However the invention is not limited in this regard. For example in some embodiments, antenna elements 138 and 140 can be combined. In other embodiments, antenna element 140 can be an internal antenna within a chassis of mobile radio 108. However, the invention is not limited in this regard. Rather any type of antenna configuration can be used in mobile radio 108, portable radio 106, and remote unit 120 to support any type of wireless communications.

In a conventional mode of operation, portable radio 106 would typically be configured to establish a long-range wireless communications link 142 with distant radio 104. In particular, the link 142 could be automatically established in response to an actuation of switch element 118. Similarly, mobile radio 108, in a conventional mode of operation, would also be configured to automatically establish a long-range wireless communications link 144 with distant radio 104. In particular, the link 144 would be established in response to an actuation of switch element 136. However, as described above, using the portable radio 106 and the mobile radio 108 can result in significant problems for many types of users.

For example, if a user is located outside vehicle 110, he would naturally first try to use portable radio 106 to establish link 142 to connect with distant radio 104. However, if distant radio 104 is outside the range of portable radio 106, the user would be required to return to vehicle 110 and use mobile radio 108 to establish link 144. In a non-emergency situation or if the user is near vehicle, such actions are acceptable. However, in an emergency situation, such relocating can be potentially life-threatening to a user or a victim that a user may be attending to. Further, if a user is at a relatively far distance from vehicle 110, it can be cumbersome and frustrating to return to vehicle 110.

In view of these problems, the various embodiments of the invention provide an alternate mode of communications for a user having access to both portable and mobile radios. In particular, the various embodiments of the invention provide for using portable and mobile radios cooperatively. That is, since a user having a portable radio will typically be in a short-range communications range of his mobile radio, embodiments of the invention provide a systems and method of creating an alternate communications mode for the portable radio and a distant radio by using a mobile radio. In particular, as shown in FIG. 1, a portable radio 106 can be configured to establish a short-range communications link 146 with mobile radio 108 in response to a sequence of one or more actuations of switch element 118. Further, in response to establishing link 146, the mobile radio 108 can establish a long-range communications session with distant radio 104. Accordingly, information is exchanged between portable radio 106 and distant radio 104 via mobile radio 108. Such a configuration is advantageous for several reasons. First, since mobile radio 108 is used to establish long-range communications link 144, a superior link is provided by the higher transmit and receive sensitivity of mobile radio 108. Second, since communications can be initiated at the portable radio, the user is not required to return to vehicle 110 in an emergency situation or when out of range of distant radio 104.

In addition to providing such an alternate communications mode, embodiments of the invention also provide an alternate method for configuring the radio 106 to begin operating in such a communications mode. In particular, one of a plurality of communications modes can be selected in response to a sequence of one or more actuations of switch element 118 at portable radio 106. That is, based on the number of actuations of switch element during a pre-defined time interval and/or the length of such actuations, one of the communications modes can be selected. For example, in one embodiment, an interval of 250-500 milliseconds can be used. However, the various embodiments of the invention are not limited in this regard.

In the various embodiments of the invention, system 102 can be configured to operate in two modes and have an actuation sequence associated with each of the modes. In particular, a single actuation of switch element 118 during the pre-defined time interval results in portable radio 106 operating conventionally and establishing link 142. In contrast, two actuations during the same time interval can instead cause portable radio 106 to establish link 146 and mobile radio 108 to establish link 144 and bridge the two communications links. In some embodiments of the invention, mobile radio 108 can be configured to automatically establish link 144. In other embodiments, an instruction to establish link 144 can be provided over link 146 to mobile radio 108. However, the various embodiments of the invention are not limited to solely the configuration described above and other actuation sequences can be associated with different communications modes for portable radio 106.

Additionally, the sequences of actuations of switch element 118 can also be used to control other aspects of system 102. For example, in some embodiments of the invention, different actuation sequences can be used to select between different mobile radios. That is, a first actuation sequence can be used to establish a link between a portable radio 106 and a distant radio 104 using a first mobile radio and a second, different actuation sequence can be used to establish a link between the portable radio 106 and a distant radio 104 using a second, different mobile radio. Such a configuration thus permits a user to contact distant radio 104 even if he is out of range of mobile radio 108 for short-range communications. In other embodiments of the invention, different actuation sequences can also be used to select different communications parameters for one or more of the components in system 102, such as the portable radio 106, the mobile radio 108, or both. For example, a first actuation sequence can be used to establish a link between a portable radio and a distant radio using a first power setting and a second, different actuation sequence can be used to establish a link between the portable radio and a distant radio using a second, different power setting. However, the various embodiments of the invention are not limited to the exemplary configurations described above. Any number of actuation sequences can be pre-defined and associated with configuring any aspects of system 102.

Additionally, in some embodiments, audio and/or visual indicia of the communications mode can be provided to the user. For example, in some embodiments, a portable radio or mobile radio can generate an audio signal for the user that indicates which communications mode is currently being used. Similarly, in systems including a display, such as portable radio 106 and mobile radio 108, the communications mode can be identified. In another example, one or more lights or other visual indicators on portable radio 106 and/or mobile radio 108 can be activated in response to a communications mode. Alternatively, a combination of visual and audio indicia can be used. However, the invention is not limited to the examples described above and other configurations for providing visual and/or audio indicia of the communications mode can be used.

As noted above, portable radio 106 may be operated using a remote unit 120 that is wirelessly linked to portable radio 106 using a short-range wireless communication link. For example, remote unit 120 can be a Bluetooth handset or headset that has been paired with portable radio 106. However, in some cases, remote unit 120 could also be paired with mobile radio 108. In such configurations, remote unit 120 can also be configured to bypass portable radio 106 and establish a communications link with distant radio 104 via mobile radio 108. Such a configuration is shown in FIG. 2.

Figure 2:
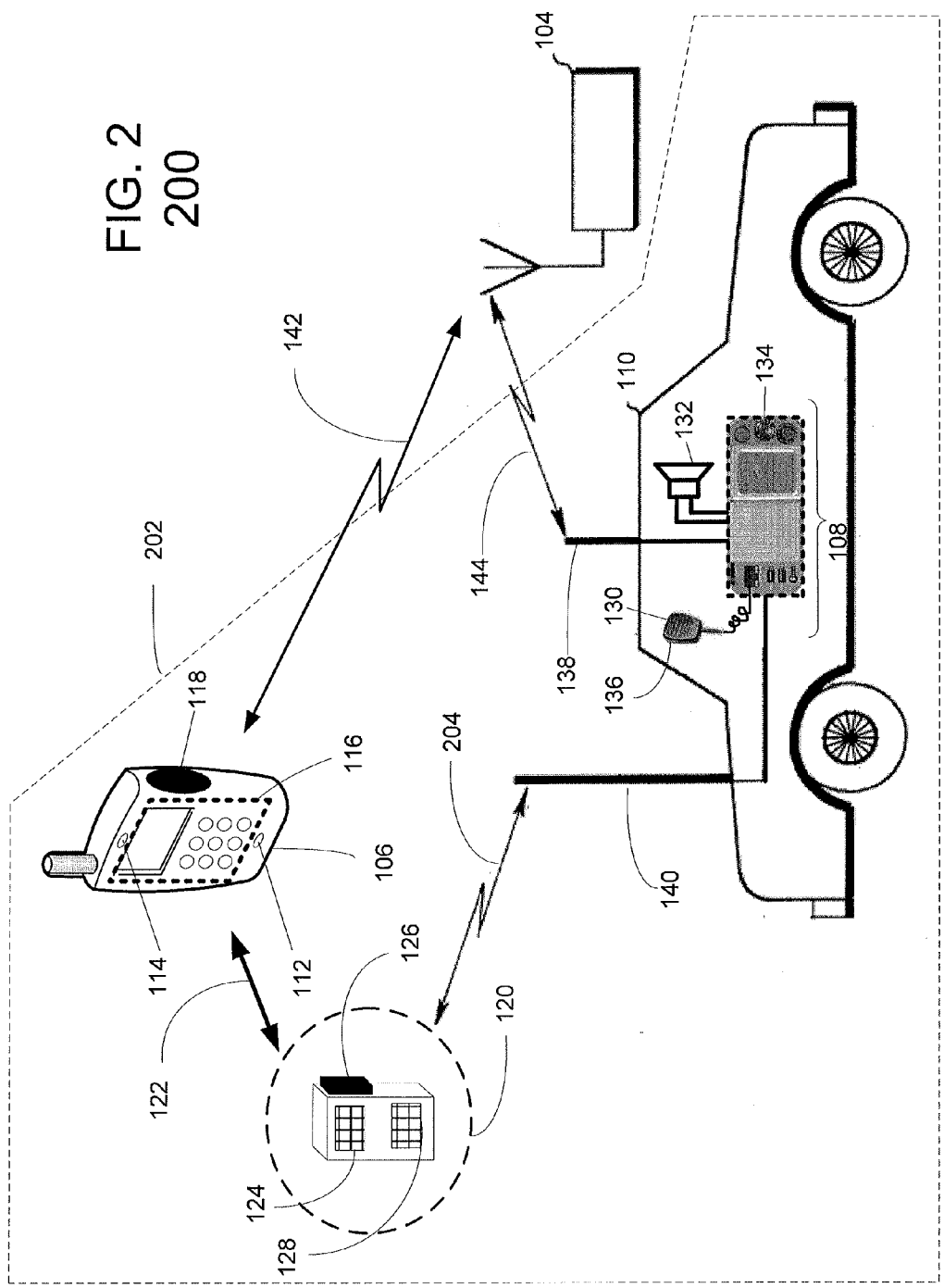
FIG. 2 is a schematic illustration of another communications system configuration according to another embodiment of the invention.

FIG. 2 is a schematic illustration of another communications system configuration 200, according to an embodiment of the invention. The configuration 200 is similar to configuration 100 in FIG. 1. Accordingly, the description above for components 104-140 is FIG. 1 is sufficient for describing these components in FIG. 2. However, even though configurations 100 and 200 are similar, components 106-140 are configured in local radio system 202 to provide a different set of communications modes as compared to system 102 in FIG. 1. In particular, rather than routing communications from remote unit 120 to distant radio 104 via portable radio 106 and mobile radio 108, remote unit is configured to directly establish a communications link with mobile radio 108 in at least one communications mode.

In particular, system 202 can be configured such that a single actuation of switch element 126 during a pre-defined time interval results in remote unit 120 operating conventionally. That is, remote unit 120 establishes a wireless link 122 with portable radio 106 and portable radio 106 establishes link 142 with distant radio 104. However, two actuations of switch 126 during the same time interval causes remote unit 120 to instead establish a new short-range wireless communications link 204 with mobile radio 108 and mobile radio 108 to establish link 144 and bridge the two communications links. Thus, a communications link is established between remote unit 120 and distant radio 104 without the portable radio 106 associated with remote unit 120. In some embodiments of the invention, mobile radio 108 can be configured to automatically establish link 144. In other embodiments, an instruction to establish link 144 can be provided over link 204 to mobile radio 108. However, the various embodiments of the invention are not limited to solely the configuration described above and other actuation sequences can be associated with different communications modes for remote unit 120.

Figure 3:
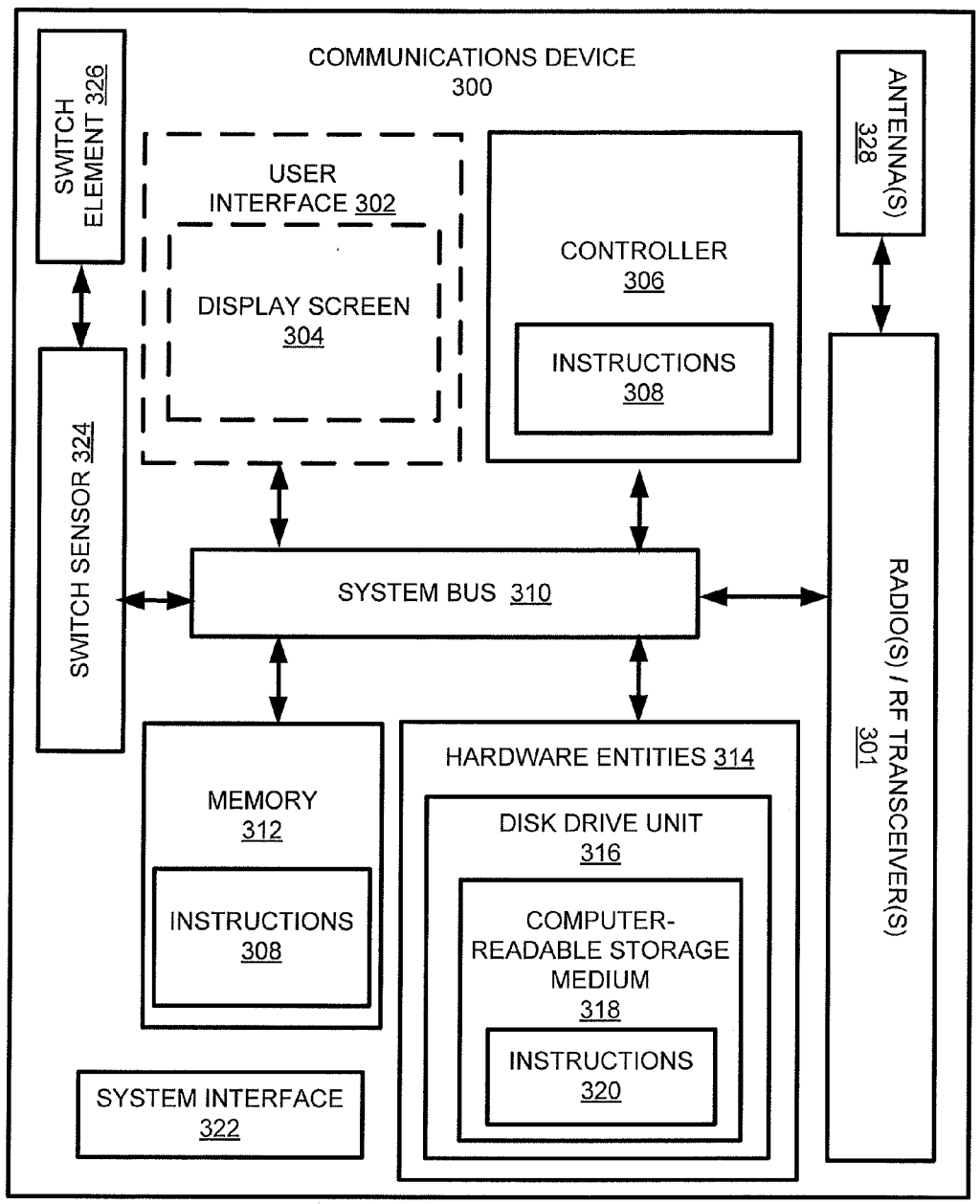
FIG. 3 is a block diagram of a radio device which can be configured for performing one or more methods described above in accordance with an embodiment of the invention.

As described above, the portable radio units, the remote units, the mobile radio units, or any portions thereof, can be implemented in any number of ways. Referring now to FIG. 3, there is provided a block diagram of a communications device 300 which can be configured for performing one or more methods described above in accordance with an embodiment of the invention. Although various components are shown in FIG. 3, the communications device 300 may include more or less components than those shown in FIG. 3. Further, the hardware architecture of FIG. 3 represents only one embodiment of a representative radio device. However, the components shown are sufficient to disclose an exemplary configuration for any of portable radio 106, mobile radio 108, remote unit 120, and distant radio 104.

The communications device 300 also includes a controller 306, a system interface 322, a system bus 310, and a memory 312 connected to and accessible by other portions of computing device 300 through system bus 310, and hardware entities 314 connected to system bus 310. At least some of the hardware entities 314 perform actions involving access to and use of memory 312, which may be any type of volatile or non-volatile memory devices. Such memory can include, for example, magnetic, optical, or semiconductor based memory devices. However the various embodiments of the invention are not limited in this regard.

The communications device 300 includes one or more radio frequency (RF) transceivers 301 coupled to one or more antennas 328 for transmitting and receiving RF signals. The device 300 also includes a switch element 326 for operating device 300, as described above with respect to switch elements 118, 126, and 136 of devices 106, 120, and 108, respectively, in FIGS. 1 and 2. Additionally, communications device 300 also includes a switch sensor 324 for detecting actuations of switch element 324. As one of ordinary skill in the art will recognize, a switch sensor can be provided in a variety of ways. For example, sensor 324 can be a standalone circuit for generating a signal based on actuations of switch 326. However, sensor 324 can also be incorporated into one or more other components of communications device 300, such as controller 306, to provide a combined control element.

In some embodiments, communications device 300 can include a user interface 302, as described above with respect to components 112-116 of device 106 and components 130-134 of device 108 in FIGS. 1 and 2. In the various embodiments of the invention, user interface 302 can be an internal or external component of communications device 300. User interface 302 can include input devices, output devices, and software routines configured to allow a user to interact with and control software applications installed on the computing device 300. Such input and output devices include, but are not limited to, a display screen 304, a speaker (not shown), a keypad (not shown), a directional pad (not shown), a directional knob (not shown), and a microphone (not shown). As such, user interface 302 can facilitates a user-software interaction on communications device 300.

System interface 322 allows the communications device 300 to communicate directly or indirectly with the other non-radio devices, such as an external user interface or computing devices. Additionally, communications device 300 can include hardware entities 314, such as microprocessors, application specific integrated circuits (ASICs), and other hardware. As shown in FIG. 3, the hardware entities 314 can also include a removable memory unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the controller 306 during execution thereof by the communications device 300. The memory 312 and the controller 306 also can constitute machine-readable media.

While the computer-readable storage medium 318 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to solid-state memories (such as a memory card or other package that houses one or more read-only (non-volatile) memories, random access memories, or other re-writable (volatile) memories), magneto-optical or optical medium (such as a disk or tape). Accordingly, the disclosure is considered to include any one or more of a computer-readable storage medium or a distribution medium, as listed herein and to include recognized equivalents and successor media, in which the software implementations herein are stored.

System interface 322 can include a network interface unit configured to facilitate communications over a communications network with one or more external devices. Accordingly, a network interface unit can be provided for use with various communication protocols including the IP protocol. Network interface unit can include, but is not limited to, a radio, a transceiving device, and a network interface card (NIC).

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A communications device, comprising:
a local radio system comprising a portable radio and a mobile radio which has a longer range capability as compared to said portable radio, said portable radio configured to operate in accordance with a plurality of communication modes and support wireless communications with a distant radio device both directly and through said mobile radio;
a switch element communicatively coupled to said portable radio and configured to selectively cause the portable radio to transmit when the switch element is actuated;
a control element for detecting one or more actuations of said switch element and configured to select a one of said plurality of communications modes based on a sequence of said actuations of said switch element detected by said control element during a pre-defined time interval and to cause a wireless transmission from said portable radio to said mobile radio according to said one of said plurality of communications modes.

2. The communications device of claim 1, wherein each of said plurality of communications modes corresponds to a different one of a plurality of pre-defined actuation sequences, each of said plurality of pre-defined actuation sequences comprising at least one among a different number of said actuations during said pre-defined time interval and a different length of time for at least one of said actuations during said pre-defined time interval.

3. The communications device of claim 1, further comprising a remote unit configured to support wireless communications with said mobile radio and communicatively coupled to said portable radio via a wireline connection, and wherein said control element is further configured to cause said wireless transmission from said portable radio to said mobile radio using a wireline communications link between said portable radio and said remote unit and a wireless communication link between said mobile radio and said remote unit when said sequence of said actuations corresponds to a first of said plurality of communications modes, wherein said remote unit is an auxiliary handset or a headset for said portable radio.

4. The communications device of claim 3, wherein said control element is further configured to cause said wireless transmission from said portable radio to said mobile radio using a direct wireless communications link between said portable radio and said mobile radio when said sequence of said actuations corresponds to a second of said plurality of communications modes.

5. The communications device of claim 1, further comprising a remote unit configured to support wireless communications with said portable radio and said mobile radio, and wherein said control element is further configured to cause said wireless transmission from said portable radio to said mobile radio using a short-range wireless communications link between said portable radio and said remote unit and a long-range wireless communications link between said mobile radio and said remote unit when said sequence of said actuations corresponds to a first of said plurality of communications modes, and wherein said remote unit is an auxiliary handset or a headset for said portable radio.

6. The communications device of claim 5, wherein said short-range wireless communications link comprises a wireless communications link using protocols selected from the group consisting of Zigbee, Z-Word, Bluetooth, Wi-Fi, DECT, and CAT-IQ protocols.

7. The communications device of claim 5, wherein said control element is further configured to provide said wireless communications between said portable radio and said mobile radio using a direct long-range wireless communications link between said portable radio and said mobile radio when said sequence of said actuations corresponds to a second of said plurality of communications modes.

8. The communications device of claim 1, wherein at least said portable radio device is configured to provide at least one among an audio or a visual indicia of said selected one of said plurality of communications modes.

9. A method of operating a communications device comprising a portable radio which is part of a local radio system including a mobile radio, said mobile radio having a longer range capability as compared to said portable radio, and said portable radio configured to support wireless communications with a distant radio device using a plurality of communications modes responsive to actuation of a switch element communicatively coupled to said portable radio, the method comprising:
  detecting one or more actuations of said switch element during a pre-defined time interval;
  selecting a one of said plurality of communications modes based on a sequence of said actuations of said switch element during said pre-defined time interval; and
  using said selected one of said plurality of communication modes to communicate with said distant radio device;
  wherein said plurality of communication modes include communicating directly from said portable radio to said distant radio device and communicating indirectly from said portable radio to said distant radio device using an intermediate wireless transmission involving said mobile radio.

10. The method of claim 9, further comprising selecting each of said plurality of communications modes to correspond to a different one of a plurality of pre-defined actuation sequences, each of said plurality of pre-defined actuation sequences comprising at least one among a different number of said actuations during said pre-defined time interval and a different length of actuation time for at least one of said actuations during said pre-defined time interval.

11. The method of claim 9, wherein said communicating indirectly further comprises establishing a wireline communications link between said portable radio and a remote unit and a wireless communication link between said mobile radio and said remote unit when said sequence of said actuations corresponds to a first of said plurality of communications modes.

12. The method of claim 11, wherein said communicating indirectly further comprises establishing a direct wireless communications link between said portable radio and said mobile radio when said sequence of said actuations corresponds to a second of said plurality of communications modes.

13. The method of claim 9, wherein said communicating indirectly further comprises establishing a short-range wireless communications link between said portable radio and a remote unit and a long-range wireless communication link between said mobile radio and said remote unit when said sequence of said actuations corresponds to a first of said plurality of communications modes.

14. The method of claim 13, further comprising selecting said short-range wireless communication link to comprise a wireless communication link using protocols selected from the group consisting of Zigbee, Z-Word, Bluetooth, Wi-Fi, DECT, and CAT-IQ protocols.

15. The method of claim 13, wherein said communicating indirectly further comprises establishing a direct long-range wireless communications link between said portable radio and said mobile radio when said sequence of said actuations corresponds to a second of said plurality of communications modes.

16. The method of claim 9, further comprising generating at least one of an audio and a visual indicia in at least said portable radio corresponding to said selected one of said plurality of communications modes.

17. A wireless communications system, comprising:
  a local radio system comprising a portable radio device and a mobile radio device which has a longer range communication capability as compared to said portable radio device,
  wherein said portable radio device is configured to support long-range wireless communications with a distant radio device both directly and indirectly through said mobile radio device by using short-range wireless communications with said mobile radio device, and said mobile radio device is configured to support said long-range wireless communications with said distant radio and said short-range wireless communications with said portable radio device,
  wherein a transmit power of said mobile radio device during said long-range communications is greater than a transmit power of said portable radio device during said long-range communications, and
  wherein said portable radio device comprises a switch element configured to cause the portable radio device to transmit when actuated and a control element for detecting one or more actuations of said switch element and configured to select a one of said plurality of communications modes based on a sequence of said actuations of said switch element detected by said control element during a pre-defined time interval and to cause a wireless transmission from said portable radio to said mobile radio according to said one of said plurality of communications modes.

18. The wireless communications system of claim 17, wherein said control element is further configured to cause said wireless transmission from said portable radio device to said distant radio device using a short-range wireless communications link between said portable radio device and said mobile radio device and a long-range wireless communications link between said mobile radio device and said distant radio device when said sequence of said actuations corresponds to a first of said plurality of communications modes.

19. The wireless communications system of claim 18, wherein said short-range wireless communications link comprises a wireless communications link using protocols selected from the group consisting of Zigbee, Z-Word, Bluetooth, Wi-Fi, DECT, and CAT-IQ protocols.

20. The wireless communications system of claim 18, wherein said control element is further configured to cause said wireless transmission from said portable radio and said distant radio using a direct long-range wireless communications link between said portable radio and said distant radio when said sequence of said actuations corresponds to a second of said plurality of communications modes.

21. The wireless communications system of claim 20, wherein said sequence of said actuations corresponding to said second of said plurality of communications modes comprises a single actuation of said switch element during said pre-defined interval, and said sequence of said actuations corresponding to said first of said plurality of communications modes comprises two actuations of said switch element during said pre-defined interval.

22. The wireless communications system of claim 17, wherein at least one of said portable radio device and said mobile radio device is configured to provide at least one among an audio or a visual indicia of said selected one of said plurality of communications modes.

* * * * *